(12) United States Patent
Foster

(10) Patent No.: US 6,352,169 B2
(45) Date of Patent: Mar. 5, 2002

(54) BUCKET HANDLE

(76) Inventor: Norman Foster, 332 E. Jefferson Ave., Kirkwood, MO (US) 63122

( * ) Notice: Subject to any disclaimer, the term of this patent is extended or adjusted under 35 U.S.C. 154(b) by 0 days.

(21) Appl. No.: 09/836,740

(22) Filed: Apr. 17, 2001

Related U.S. Application Data

(60) Provisional application No. 60/198,984, filed on Apr. 21, 2000.

(51) Int. Cl.[7] .................................................. B65D 25/00
(52) U.S. Cl. ........................ 220/755; 220/755; 220/773
(58) Field of Search ................................ 220/755, 760, 220/773, 775, 776

(56) References Cited

U.S. PATENT DOCUMENTS

| | | | | |
|---|---|---|---|---|
| 912,526 A | * | 2/1909 | Barr ........................ | 220/776 X |
| 1,219,402 A | * | 3/1917 | Rutan ....................... | 220/773 X |
| 2,156,274 A | * | 5/1939 | Brown ..................... | 220/755 X |
| 2,329,656 A | * | 9/1943 | Sedgwick ................ | 220/773 X |
| 3,186,414 A | * | 6/1965 | Davis ....................... | 220/773 X |
| 3,224,625 A | * | 12/1965 | Sperl ........................ | 220/760 X |
| 3,866,791 A | * | 2/1975 | Roper et al. ............. | 220/773 X |
| 4,941,586 A | * | 7/1990 | Tarna ....................... | 220/773 X |
| 5,310,079 A | * | 5/1994 | Sandy et al. ............. | 220/755 X |

* cited by examiner

Primary Examiner—Steven Pollard
(74) Attorney, Agent, or Firm—Polster, Lieder, Woodruff & Lucchesi, L.C.

(57) ABSTRACT

A replaceable bucket handle having a bend in the middle and configured like an inverted V for mounting inside the bucket below the rim to resist sliding of the handle on a hook and to raise the bucket relative to a seated user. The handle resists damage to and collapse of the bucket under load.

12 Claims, 4 Drawing Sheets

BUCKET HANDLE

CROSS REFERENCE TO RELATED APPLICATIONS

This application claims priority to provisional patent application Ser. No. 60/198,984, filed Apr. 21, 2000.

BACKGROUND OF THE INVENTION

The invention is related generally to buckets or pails and, more specifically, an improved handle design for use with a bucket, particularly a bucket used by window cleaners on high rise buildings.

Buckets or pails with handles are known to the art. However, those persons employed as window cleaners or window washers on high rise buildings use buckets containing cleaning liquid or water that must meet certain requirements of the trade. That is, the window washer generally is seated in what is known in the art as a "boatswain chair". The high-rise window washer accesses windows by swing stage or boatswain chair. The two systems that use the boatswain chair are the Manual Boatswain Chair and the Control Descent System. The Manual Boatswain Chair system uses block and tackle to raise or lower the window washer to the windows. The Control Descent System uses gravity by starting at the roof and repelling over the side. The rate of descent is controlled using a descent device. The descent device regulates the movement down the rope by way of friction. The window washer can descend down to the window and then lock the device until ready to descend to the next window.

In most cases, the window washer hangs his bucket from on the side of the boatswain chair so that the bucket is accessible. Prior art buckets typically used for hanging on a boatswain chair have several drawbacks. First, to keep the weight down, the buckets usually are plastic with thin, wire handles. The bucket is attached to the boatswain chair by fastening the wire handle onto a snap hook on the boatswain chair. A conventional wire handle can shift or slide along the snap hook and tip or spill. Furthermore, the weight of the liquid in the bucket can cause the handle to pull out or deform the handle or cause the plastic to crack and fail around the handle. Since conventional handles are mounted on the outside of the bucket, weight can cause the bucket to collapse inwardly from the sides where the handle is mounted. Also, since the bucket handle is mounted near the rim and has a substantial curve, the bucket itself is suspended somewhat low relative to the washer seated on the boatswain chair and thus can be inconvenient to use.

It would be advantageous, therefore, to have a bucket handle for a window washer's bucket that resists sliding and tipping, resists breaking and bending of the bucket, while allowing convenient access to the bucket by the window washer on the boatswain chair.

SUMMARY OF THE INVENTION

It is among the several objects of the invention to provide bucket or pail with a handle for that resists sliding or tipping when the handle is secured by a clip attached to the center of the bucket handle.

Another object of the invention is to provide such a bucket and handle which resists damage or distortion of the bucket under load.

Still another object of the invention is to provide a bucket handle that can be mounted to a conventional bucket or pail.

Yet another object of the invention is to provide a bucket and handle that provides more convenient access to the bucket by a user seated on a boatswain chair.

In accordance with the invention, generally stated bucket with a handle that resists sliding or tipping when attached to a hook, that resists distortion and damage when under load, and places the bucket in a convenient proximity to a user in a seated position. In the preferred embodiment, the bucket is a conventionally designed bucket or pail including a replaceable handle on the bucket made from ⅜ inch aluminum rod. The handle has one relatively sharp bend, configured like an inverted V, in the middle of the handle resulting in an apex for attachment to a hook. The handle includes laterally extending, externally threaded mounting extensions at the terminal end of each arm of the V. The handle is mounted inside the bucket and positioned below the rim of the bucket. Each end of the handle is mounted to the bucket wall using an inner and an outer reinforcing plate, each having a central hole formed therein. The reinforcing plates are positioned on each side the bucket wall over a predrilled hole and fastened together with screws, with the bucket wall sandwiched in between the reinforcing plates. The externally threaded lateral mounting extension is inserted through holes in the reinforcing plates and bucket wall and secured with stainless steel lock nuts on the threaded extensions protruding through the bucket wall. A guard can be attached to cover the lock nut to prevent scratching or snagging the structure being accessed.

The handle can rotate at the mounts, much like a conventional handle. The sharp bend or apex resists sliding when the handled is attached to a hook. The handle is mounted inside the bucket and functions like a brace to prevent the bucket from compressing or collapsing under weight when filled. Because the handle is mounted below the rim, the bucket effectively is raised for easier access, relative to a window washer seated on a boatswain chair when the handle is attached to a snap hook on the boatswain chair.

These and other objects of the invention will be apparent from a review of the specification and drawings.

BRIEF DESCRIPTION OF THE DRAWINGS

Corresponding reference numerals indicate corresponding structures throughout the various drawings.

DETAILED DESCRIPTION OF THE INVENTION

Figure 1:
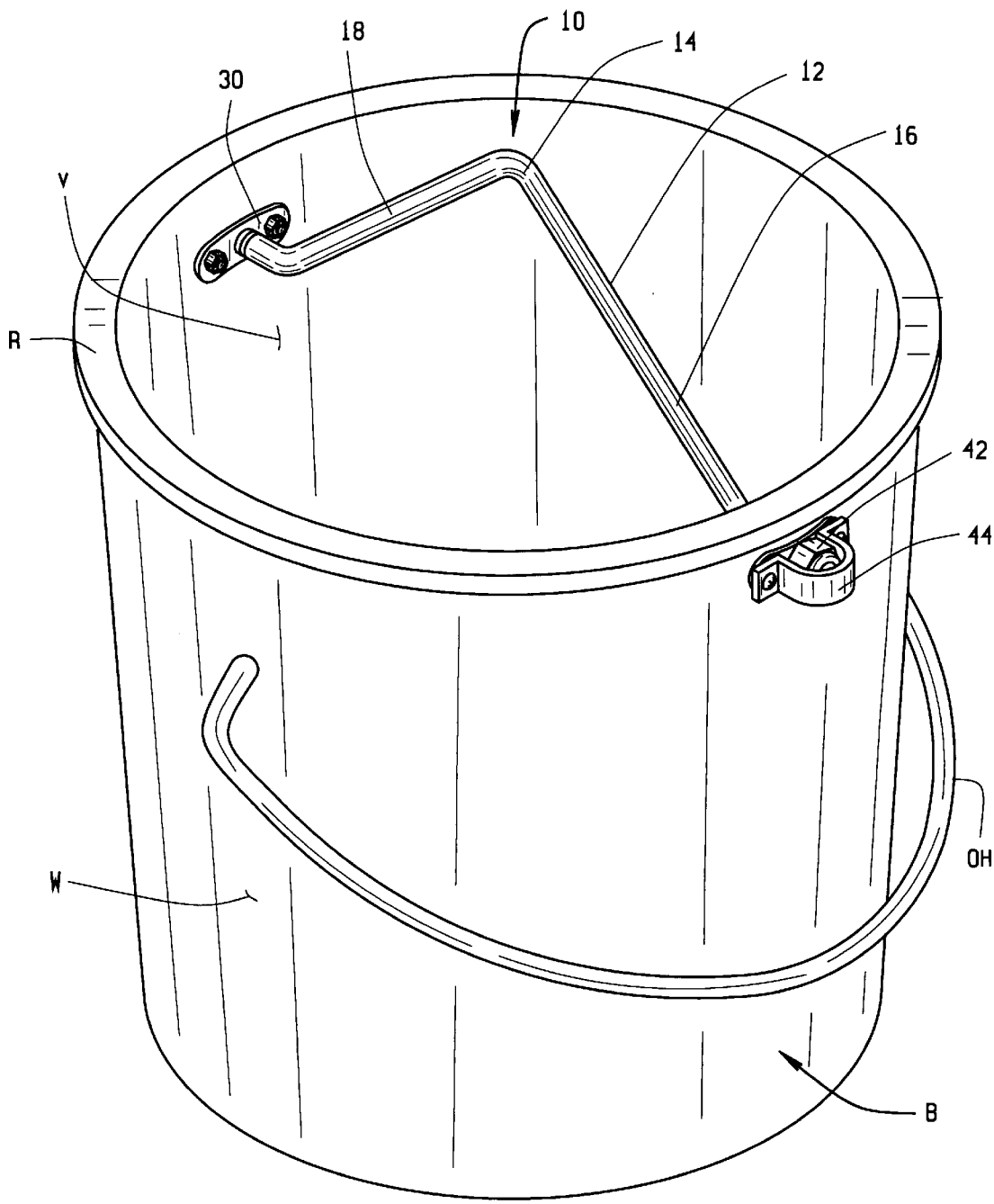
FIG. 1 is a perspective view of and bucket and novel bucket handle of the present invention.
Figure 2:
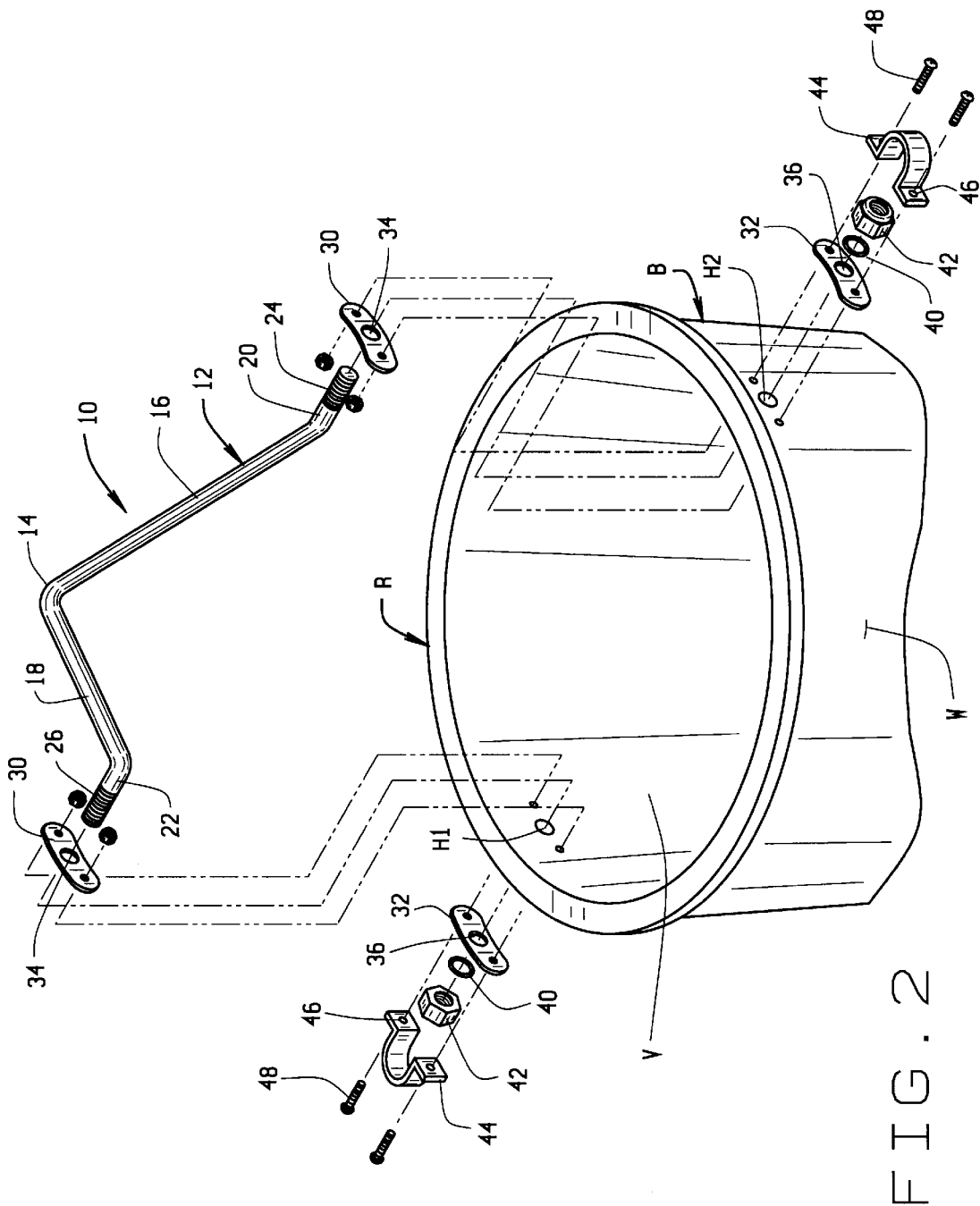
FIG. 2 is an exploded view of the bucket handle and bucket.
Figure 3:
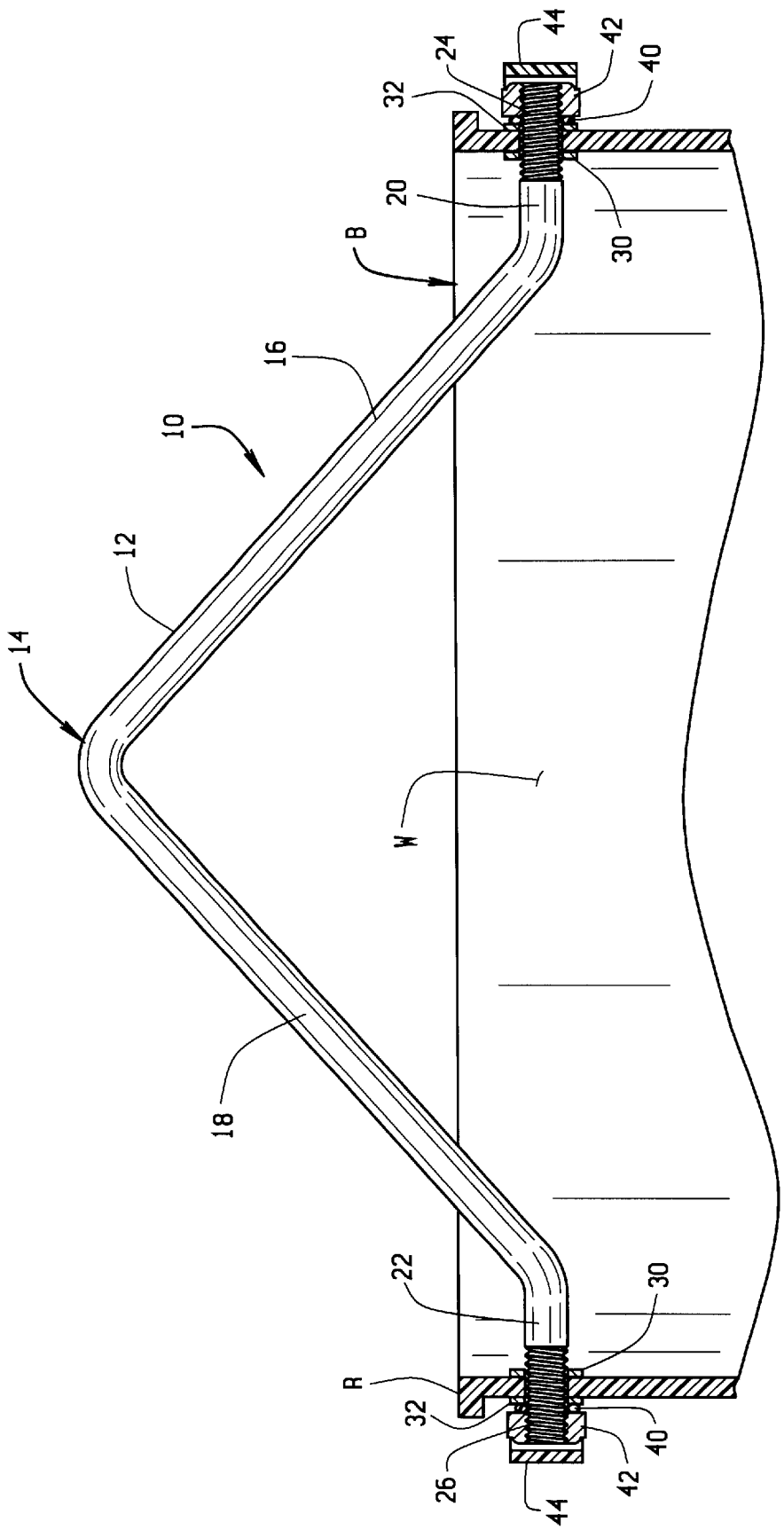
FIG. 3 is a front elevation of the bucket handle mounted to a bucket shown in cross section, illustrating the position of the handle.

The novel bucket handle is indicated in the drawings by reference numeral 10. As seen in FIG. 1, handle 10 is attached to a conventional pail or bucket, indicated generally as B. Bucket B can be any type of bucket or pail, but in many applications, bucket B is a 5 gallon plastic pail. In any case, bucket B includes a circumferential side wall W, which can be round, as shown, or rectangular, with a rim R or top edge. The circumferential wall W and the bottom of the bucket define the useful container portion of the bucket, which will be referred to as the inner volume V. As will be appreciated, handle 10 has a generally inverted V configuration, having an body 12 with a centrally positioned apex 14. The body has a first arm 16 and a second arm 18. The arms 16 and 18 slope downwardly and are outwardly angled from apex 14. Arm 16 terminates in laterally extending mounting extensions 20 and arm 18 terminates in laterally extending mounting extension 22. The extreme ends of the mounting extensions 20 and 22 have external threaded sections 24 and 26, respectively. In the preferred embodiment, handle 10 is an integral piece formed from metal, for example from ⅜ inch aluminum rod bent into the desired configuration. The apex can be an angle ranging from approximately 90° to approximately 110°, preferably about 100°. However, any appropriate angle formed from any appropriate stock would be acceptable As best seen in FIGS. 1 and 3, handle 10 is mounted with the bucket below the rim R of bucket B. In one preferred embodiment the handle is mounted about 1 inch below the rim, but the handle can be mounted more or less than one inch, depending upon how far below a hook the user desires the bucket to be suspended, as will be explained below. It is preferred that the apex 14 protrude above rim R. A hole H1 is drilled through the wall of bucket B at a predetermined position. A second hole H2 is drill through the bucket wall directly across from the first hole. Each end of handle 10 includes the same mounting hardware, as follows. A pair of reinforcing plates 30 and 32, having holes 34 and 36, respectively, are positioned over the holes in the bucket wall. As shown, plate 30 is positioned on the inner surface of the bucket wall and plate 32 is positioned on the outer surface of the bucket wall. The threaded ends 20, 22 of the handle are inserted through the holes in the plates and the holes in bucket wall, a washer 40 is placed over the ends and a stainless steel nut 42 is tightened on the threads. A U shaped guard 44 with screw holes 46 is positioned over nut 42. The guard 44 is optional and used to prevent scratching, snagging or catching of the nuts on objects or damage to the mounting apparatus. The plates 30, 32 and guard 44 are held tightly in place with and held together with stainless steel screws 48 or the like, with the bucket wall sandwiched in between plates 30 and 32. It will be appreciated that the holes in the bucket wall and plates are slightly greater in diameter than the diameter of the threaded ends of the extensions so that the handle 10 can rotate in the holes, like a conventional bucket handle. Moreover, the plate prevent the handle from pulling through the plastic and can prevent handle failure, which is an important safety consideration if the bucket is suspended high overhead.

Figure 4:
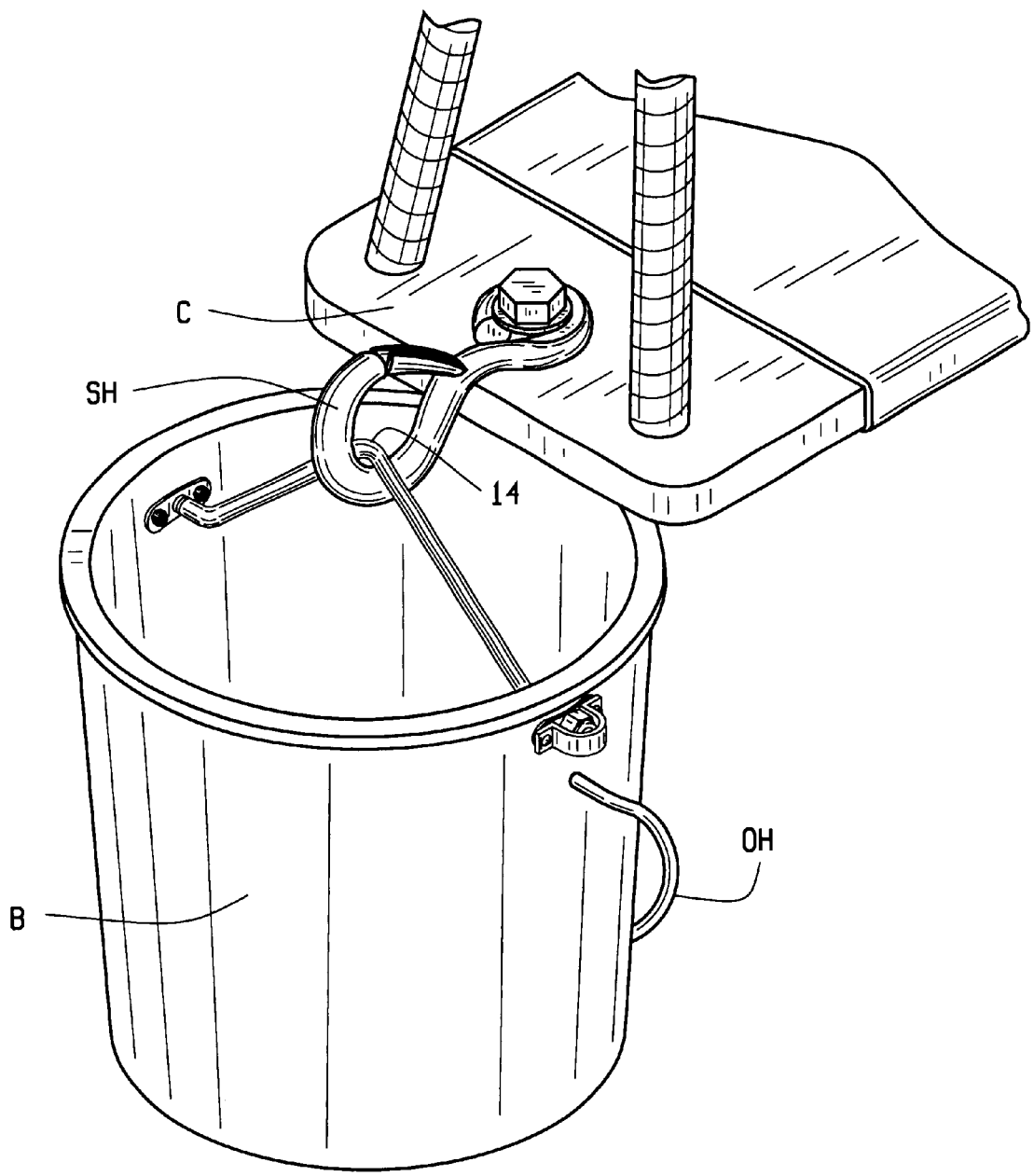
FIG. 4 is a perspective view of a bucket and handle attached to a window washer's boatswain chair.

As can be appreciated by review of FIG. 4, the bucket and handle can be attached to a boatswain chair C. Handle 10, when secured on a snap hook SH at apex 14, the hook rests in the apex and will not easily slide or move. If it is displaced, the handle will slide down the arm and come to rest at the angle. Because handle 10 is mounted inside the bucket B, the handle functions as a brace against to prevent collapse of the bucket walls when used with a plastic or thin walled bucket. Also, as seen in FIG. 4, by mounting handle 10 below rim R of the bucket, the bucket itself is effectively is raised relative to the boatswain chair to provide easier access by a user seated on the boatswain chair. As stated above, the bucket can be raised Since handle 10 is fashioned from metal stock and virtually indestructible, when a bucket wears out, the handle and mounting hardware can be removed and installed on a new bucket. Also, for convenient and comfortable hand carrying, the original bucket handle OH can be retained on the bucket and simply rotated out of the way when the bucket is mounted on a boatswain chair, as shown in the drawings.

It will be apparent to those skilled in the art that various changes and modifications can be made in the novel bucket handle without departing from the scope of the invention. For example, although the novel handle and bucket are described as being used with or suspended from a boatswain chair, it will be understood that the handle allows the bucket to be safely and conveniently suspended from other devices, for example a hook on a ladder or scaffolding. Painters or plasterers may employ such a combination to benefit from the fact that the handle and mounting hardware prevent collapsing of the bucket, damage to the bucket or handle failure. Therefore, the foregoing description and accompanying drawing are intended to be illustrative only and should not be construed in a limiting sense.

What is claimed is:

1. A bucket handle for mounting on a bucket having circumferential wall and an upper rim defining an inner volume, the handle comprising:

an inverted V shaped handle body including an apex at a midpoint thereof, a first arm downwardly angled from the apex and a second arm downwardly angled from the apex, a laterally extending mounting section at a terminal end of the first arm, a second laterally extending mounting section at a terminal end of said second arm, and apparatus for rotatably attaching each recited mounting sections to the bucket wall.

2. The handle of claim 1 wherein the apparatus for rotatably attaching each recited mounting section to the bucket wall further comprises:

a first mounting plate having a hole formed centrally therein for positioning on a inner surface of the bucket wall and around a hole in the bucket wall;

a second mounting plate having a hole formed centrally therein for positioning on an outer surface of the bucket wall and around said hole, opposite said first mounting plate, whereby said mounting section extends through said hole in said first mounting plate, said hole in the bucket wall, and said hole in said second mounting plate.

3. The handle of claim 1 wherein each recited mounting sections have external threads.

4. The handle of claim 3 wherein the apparatus for rotatably attaching each recited mounting section to the bucket wall further comprises an internally threaded nut for engaging said external threads.

5. The handle of claim 1 further comprising a guard around the apparatus for rotatably attaching each recited mounting section to the bucket wall.

6. The handle of claim 1 wherein said handle body is formed from aluminum stock.

7. A bucket and handle combination comprising:

a bucket having a circumferential wall and upper rim defining an inner volume, said wall having a first handle mounting hole and an opposed second handle mounting hole formed therein;

a handle attached to said bucket wall within the volume and below the rim, said handle having a first arm and a second arm, said arms downwardly and outwardly angled from an apex, a first laterally extending, attachment section on a terminal end of said first arm and positioned in said first handle mounting hole and a second laterally extending, attachment section on a terminal end of said second arm and positioned in said second handle mounting hole; and mounting apparatus at each of said first and second handle mounting hole for securing said attachment sections in said holes.

8. The combination of claim 7 wherein each said laterally extending attachment section is externally threaded and said attachment apparatus further includes a internally threaded nut for securing said attachment sections in said hole.

9. The combination of claim 7 wherein each said mounting apparatus further comprises a first reinforcing plate positioned on an inner surface of said bucket wall and a second reinforcing plate positioned on an outer surface of said bucket wall.

10. The combination of claim 7 wherein said handle is formed from aluminum stock.

11. A bucket comprising:

a bucket having a circumferential wall, a rim at the top of the circumferential wall and a bottom, the circumferential wall and the bottom wall defining an inner chamber;

a handle having a first horizontally extending end and a second horizontally extending end with an apex midway between the recited ends, said handle being rotatably connected to an inner surface of the circumferential wall at said first and second ends so that the apex of the handle protrudes above the rim of the circumferential wall.

12. A boatswain chair and bucket comprising:

a boatswain chair having a hook mounted at one end;

a bucket suspended from said hook, said bucket having a circumferential wall with an upper rim defining an inner volume, and a handle, said handle having a first arm and a second arm, said arms downwardly and outwardly angled from an apex, a first laterally extending attachment section on a terminal end of said first arm and a second laterally extending, attachment section on a terminal end of said second arm, said recited attachment sections rotatably attached to said bucket wall within the volume and below the rim wherein said apex of said handle engages the hook when the bucket is suspended from the hook.

* * * * *

UNITED STATES PATENT AND TRADEMARK OFFICE
CERTIFICATE OF CORRECTION

PATENT NO.   : 6,352,169 B2
DATED        : March 5, 2002
INVENTOR(S)  : Norman Foster It is certified that error appears in the above-identified patent and that said Letters Patent is hereby corrected as shown below:

<u>Column 3,</u>
Line 56, begin a new paragraph before "Since"

<u>Column 4,</u>
Line 54, replace "a handle" with -- an inverted V shaped handle --

<u>Column 5,</u>
Line 15, replace "a handle" with -- an inverted V shaped handle --

<u>Column 6,</u>
Line 9, replace "a handle" with -- an inverted V shaped handle --

Signed and Sealed this

Twenty-fifth Day of February, 2003

JAMES E. ROGAN
*Director of the United States Patent and Trademark Office*